(12) United States Patent
Goodridge

(10) Patent No.: US 12,241,263 B2
(45) Date of Patent: Mar. 4, 2025

(54) POLYURETHANE FLOOR WITH WOOD LOOK, AND RELATED APPARATUS

(71) Applicant: Robbins, Inc., Cincinnati, OH (US)

(72) Inventor: Todd Goodridge, Independence, KY (US)

(73) Assignee: Robbins, Inc., Cincinnati, OH (US)

( * ) Notice: Subject to any disclaimer, the term of this patent is extended or adjusted under 35 U.S.C. 154(b) by 361 days.

(21) Appl. No.: 17/113,353

(22) Filed: Dec. 7, 2020

(65) Prior Publication Data

US 2021/0180332 A1    Jun. 17, 2021

Related U.S. Application Data

(60) Provisional application No. 62/944,508, filed on Dec. 6, 2019.

(51) Int. Cl.
| | |
|---|---|
| *E04F 15/14* | (2006.01) |
| *B05D 1/28* | (2006.01) |
| *B05D 3/12* | (2006.01) |
| *C09D 5/28* | (2006.01) |

(Continued)

(52) U.S. Cl.
CPC ............ *E04F 15/142* (2013.01); *B05D 1/28* (2013.01); *B05D 3/12* (2013.01); *C09D 5/28* (2013.01); *C09D 175/04* (2013.01); *E04F 21/24* (2013.01)

(58) Field of Classification Search
CPC ............ E04F 15/02155; E04F 15/0215; E04F 15/02161; E04F 15/02166; E04F 15/02172; E04F 15/02177; E04F 15/02183; E04F 15/08; E04F 15/082; E04F 15/10; E04F 15/102; E04F 15/105; E04F 15/107; E04F 15/182; E04F 15/186; E04F 15/22;

(Continued)

(56) References Cited

U.S. PATENT DOCUMENTS

| | | | | | |
|---|---|---|---|---|---|
| 2,771,824 | A | * | 11/1956 | Patch | ...................... E04F 15/12 |
| | | | | | 428/101 |
| 3,364,058 | A | * | 1/1968 | Wagner ................... E04F 15/12 |
| | | | | | 404/31 |

(Continued)

FOREIGN PATENT DOCUMENTS

FR    2797284 A1 *  2/2001   ............. B32B 27/20

*Primary Examiner* — Kyle J. Walraed-Sullivan
(74) *Attorney, Agent, or Firm* — Wood Herron & Evans LLP

(57) ABSTRACT

A poured, seamless polyurethane floor includes woodgrain markings and floorboard markings protected within a top clear coating, thereby to achieve a poured seamless floor with a "wood look." The woodgrain markings are achieved by moving a heavy brush through the wear layer, during installation, prior to curing. The longitudinal floorboard markings may be achieved by moving a line marking apparatus over the upper layer, parallel with the woodgrain markings, after the wear layer has cured. The line marking apparatus assures distinct parallel floorboard lines on the wear layer, due to the use of permanent markers held in a downwardly biased, spring-loaded condition during movement of the apparatus over the floor. The installer then marks the transverse floorboard lines. A top coat seals and protects the woodgrain marking and the floorboard lines, thereby resulting in a seamless, poured polyurethane floor with a permanent wood look.

8 Claims, 7 Drawing Sheets

(51) Int. Cl.
*C09D 175/04* (2006.01)
*E04F 21/24* (2006.01)

(58) Field of Classification Search
CPC . E04F 15/18; E04F 21/24; E04F 15/12; E04F 15/126; E04F 15/14; E04F 15/142
See application file for complete search history.

(56) References Cited

U.S. PATENT DOCUMENTS

| | | | | |
|---|---|---|---|---|
| 3,401,069 A * | 9/1968 | Lorentzen | E04F 15/12 | 428/319.3 |
| 3,549,471 A * | 12/1970 | Denton | E04F 15/18 | 52/287.1 |
| 3,560,315 A * | 2/1971 | Lea | E04F 15/12 | 52/390 |
| 3,562,076 A * | 2/1971 | Evanss | D06N 7/0055 | 428/325 |
| 3,801,421 A * | 4/1974 | Allen | E01C 13/08 | 528/80 |
| 4,054,699 A * | 10/1977 | Brinkley | B44C 3/005 | 428/48 |
| 4,100,125 A * | 7/1978 | Pezzuto, Jr. | C08J 3/091 | 524/475 |
| 4,103,056 A * | 7/1978 | Baratto | B44F 9/02 | 428/17 |
| 4,112,176 A * | 9/1978 | Bailey | B32B 13/08 | 428/407 |
| 4,301,207 A * | 11/1981 | Schomerus | E04F 15/00 | 472/92 |
| 4,457,120 A * | 7/1984 | Takata | E01C 13/065 | 52/309.4 |
| 4,555,292 A * | 11/1985 | Thompson | E04F 15/02 | 404/19 |
| 4,614,686 A * | 9/1986 | Coke | E01C 13/065 | 427/407.1 |
| 4,622,257 A * | 11/1986 | Thompson | E04F 15/10 | 427/407.1 |
| 4,662,972 A * | 5/1987 | Thompson | E04F 15/04 | 404/19 |
| 4,800,119 A * | 1/1989 | Kolar | E04F 15/12 | 428/317.1 |
| 5,085,424 A * | 2/1992 | Wood, Jr. | B32B 7/12 | 428/17 |
| 5,111,627 A * | 5/1992 | Brown | E04F 15/08 | 52/126.5 |
| 6,770,328 B1 * | 8/2004 | Whaley | B44C 5/0407 | 427/407.1 |
| 8,186,117 B2 * | 5/2012 | Eren | E04D 11/02 | 428/17 |
| 2003/0091831 A1 * | 5/2003 | Mickey | E04F 15/12 | 428/423.1 |
| 2004/0062937 A1 * | 4/2004 | Lyons | B32B 9/045 | 428/455 |
| 2006/0210755 A1 * | 9/2006 | Blazek | B32B 7/12 | 428/44 |
| 2007/0059492 A1 * | 3/2007 | Oldorff | E04F 15/02033 | 428/192 |
| 2011/0059239 A1 * | 3/2011 | Oldorff | B44F 9/00 | 427/407.1 |
| 2016/0368276 A1 * | 12/2016 | Potter | B44C 5/04 | |
| 2018/0029407 A1 * | 2/2018 | Yu | E04F 15/048 | |
| 2019/0023045 A1 * | 1/2019 | Urrutia Bazán | B44C 5/04 | |
| 2022/0250304 A1 * | 8/2022 | Dipaula | B29C 53/04 | |
| 2023/0349145 A1 * | 11/2023 | Hall | B62D 63/08 | |
| 2024/0058831 A1 * | 2/2024 | Ferdman | E04F 15/12 | |

* cited by examiner

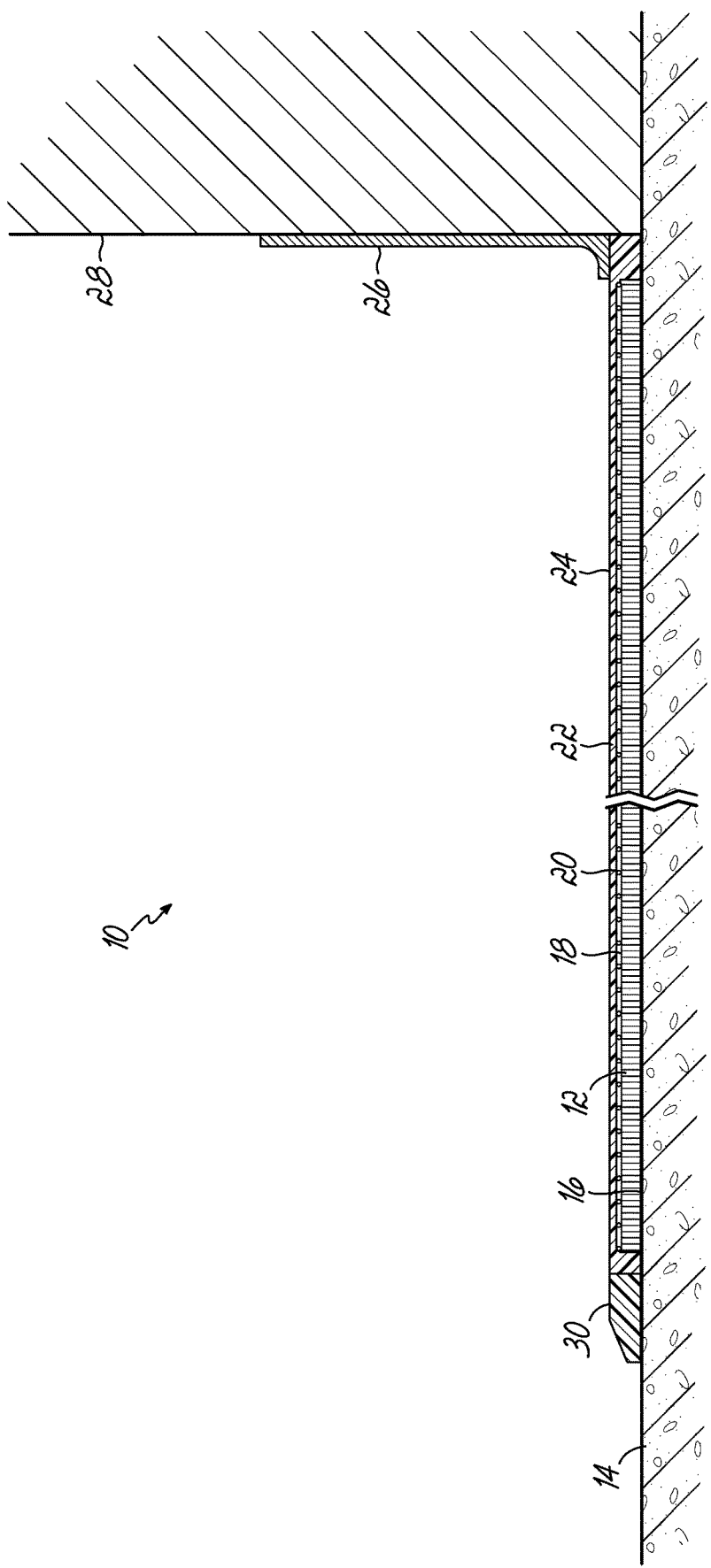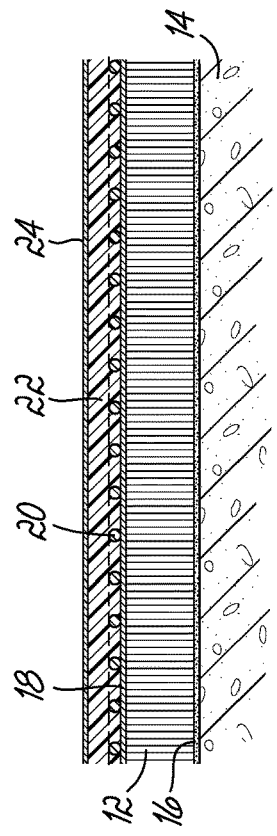

POLYURETHANE FLOOR WITH WOOD LOOK, AND RELATED APPARATUS

CROSS-REFERENCE TO RELATED APPLICATION

This application claims the benefit of U.S. Provisional Patent Application Ser. No. 62/944,508 filed on Dec. 6, 2019, the disclosure of which is expressly incorporated by reference herein in its entirety.

FIELD OF THE INVENTION

The present invention relates to synthetic floors, and particularly to a synthetic floor with a "wood look."

BACKGROUND OF THE INVENTION

In recent years, synthetic floors have achieved a high degree of popularity for institutional venues such as school gymnasiums and recreational centers, due to their relatively long life and ease of maintenance. Currently, two types of synthetic floors dominate the U.S. market, namely, vinyl floors and poured polyurethane floors.

Vinyl synthetic floors provide a reasonably high degree of shock absorption, uniformity, and comfort for athletes, and can also serve as a good choice for non-sport activities, including conferences, assemblies, or other events, due in part to their relatively low cost. However, with respect to a number of factors, polyurethane floors compare advantageously with vinyl floors. Among those factors are toughness, durability, less susceptibility to temperature changes, relatively long life, and the ability to withstand high point loads and rolling loads which are associated with heavy equipment.

Perhaps most importantly, a poured polyurethane floor is seamless, whereas a vinyl floor has seams. Eventually, if the underlying adhesive deteriorates or force is applied to the seam of a vinyl floor, the floor will fail along one or more seams. Also, a vinyl floor's susceptibility to expansion and contraction with temperature changes is particularly acute along the seams. Simply stated, the seams magnify some of the above-described vulnerabilities of a vinyl floor.

A polyurethane floor can be multicolor, by changing the top coat colors, and this change does not affect the overall performance of the floor. In contrast, with a vinyl floor the colors must be cut in, which requires even more seams.

For almost all buildings, a polyurethane floor will last for the life of the building, including refurbishments. In fact, a polyurethane floor can be re-topcoated after 12 years. In contrast, a vinyl floor will eventually need to be removed, discarded and replaced. Further, because a removed vinyl floor cannot be reused or recycled, it instead will typically end up in a landfill. In comparison, after a relatively long and useful life, a polyurethane floor can be ground up and reused. For these reasons, a polyurethane floor is more environmentally friendly than a vinyl floor.

Further, because polyurethane floors are made of poured urethane, they are relatively easy to repair. The repair can be localized, at the site of the problem. In contrast, when a vinyl floor needs to be repaired, it must be patched in and then re-seamed.

Some vinyl floors have a top surface that is intended to provide a "wood look." For example, a synthetic vinyl floor sold under the ELASTIWOOD™ trademark has a wood look. However, the wood look appears on a vinyl AEP (area elastic performer) layer, and thus, as a vinyl floor, this floor suffers from all of the same limitations described above with respect to other vinyl floors. Moreover, this wood look results from a maple print on the vinyl that is warranted by the manufacturer for only one year. This means that unless the original wood look is periodically reprinted or replaced, this so-called maple print provides only a temporary wood look.

A polyurethane floor can be installed so as to have the same friction coefficient as a wood floor. Currently, such floors do not have a wood look. For example, one commercially available synthetic floor, a polyurethane floor, is sold under the ELASTIPLUS™ trademark. This particular floor does not have a wood look.

Another type of synthetic, polyurethane floor currently sold in the market is known as the POLYTURF PLUS™ floor. Again, this floor does not have a wood look. In contrast, the same supplier of the POLYTURF PLUS™ floor does supply a wood look vinyl floor under the trademark OMNISPORT™.

Despite these known advantages of a polyurethane floor over a vinyl floor, often the driving factor in a purchase decision will be the desire for a wood look on the surface of the floor, to mimic the look of a hardwood floor. In such cases the resulting choice will often be a vinyl floor, despite the above-described accompanying disadvantages.

It is an object of this invention to achieve a wood look for a synthetic floor while at the same time avoiding all of the above-described disadvantages of a synthetic vinyl floor.

It is another object of this invention to achieve a synthetic floor with a wood look where the floor and the wood look last longer than that of currently available synthetic vinyl floors.

SUMMARY OF THE INVENTION

The present invention achieves the above-stated objectives by modifying the uppermost wear layer of a poured polyurethane floor, prior to curing, to create woodgrain markings, and then after curing of the same layer, marking floorboard lines thereon to create a floorboard look. The woodgrain markings create a woodgrain look, and the floorboard lines create a floorboard look, which together forms a wood look. The installer then locks in the wood look, i.e., the woodgrain markings and the floorboard lines, with a top or finishing coat.

According to one preferred embodiment of the invention, the woodgrain markings are achieved by moving a blacktop brush in a generally parallel direction over the uncured uppermost wear layer. The bristles of this type of brush cause various woodgrain-like streaks to form in the wear layer. The effect of these grain-like streaks is greater if the color of the underlying layer differs, which is typically 2 mm thick, from that of the uppermost wear layer, particularly if it is darker, i.e., black or dark gray.

According to another preferred embodiment of the invention, after the uppermost wear layer has cured, the installer then moves a floorboard marking apparatus, or tool, along the same general direction as the floor grains. This apparatus holds a plurality of markers in a spring-loaded and downwardly-biased condition, so that wheeled movement of the tool along the floor causes a plurality of parallel floorboard lines to be marked onto the top surface of the cured uppermost wear layer, generally in alignment with the orientation of the woodgrains previously caused by the brush.

Preferably, the apparatus includes a wheel-mounted base, upwardly extending handles, and a transversely oriented frame that holds the markers, and also holds two outer elongated guides. The wheels are relatively wide and preferably machined to a flat surface, to better assure consistent and steady movement over the floor, which typically occurs by an operator using the upwardly extending handles during movement.

Thereafter, the installer marks the lateral transverse lines of the floorboards in various appropriate locations, to create the appearance of multiple parallel rows of floorboards laid end to end, i.e., the floorboard look. After the woodgrain markings and the floorboard lines have been marked on the top surface of the uppermost wear layer, the installer then applies a top coat to protect and lock the markings and the lines in place, to lock in the wood look.

The techniques described herein result in a poured seamless polyurethane floor with a wood look that will last as long as the floor itself. Accordingly, for school gymnasiums, recreational centers, and similar venues, floor purchasers will now have the option to choose a synthetic floor that includes all of the known benefits of a poured polyurethane floor, but which also includes a highly desired wood look. Moreover, for all practical purposes this inventive seamless floor, with a wood look, is permanent.

In one embodiment of the invention, a synthetic floor with a wood look includes a substrate, a base layer adhered to the substrate, a seal layer formed on top of the base layer, a coating of polyurethane formed on top of the seal layer, the coating of polyurethane having woodgrain markings formed therein and a plurality of floorboard lines marked thereon, and a clear sealer topcoat formed on top of the coating of polyurethane, thereby to seal and protect the wood-grain markings formed in the coating and the floorboard lines marked thereon. In another embodiment, the coating of polyurethane is formed on top of an underlying coating of polyurethane that is formed on the seal layer. In yet another embodiment, the underlying coating of polyurethane and the coating of polyurethane are two different colors. Still further, a fabric mesh layer may be included on top of the seal layer for additional lateral integrity, and a rubber base may be fixed to the clear sealer topcoat to cover a joint between the floor and a surrounding wall.

In one embodiment of the invention, a floorboard marking apparatus is used to mark floorboard lines on the floor. The floorboard marking apparatus includes a base supported by a plurality of wheels and having at least one upwardly extending handle and a frame mounted to a front of the base, the frame having an elongated length extending transversely to the base and greater than a width of the base. The floorboard marking apparatus further includes a plurality of rearwardly extending fingers hingeably mounted to the frame. Each of the plurality of fingers supports a marker and is held in a downwardly biased position by a spring to cause the marker to engage the floor, to mark the floorboard lines thereon. First and second guides mount to opposite outermost ends of the frame.

According to one aspect of the present invention, the first and second guides extend beyond the front of the base. Further, the first and second guides may be mounted to the frame by a support arm that is configured to space the corresponding first and second guides away from the frame. Preferably, at least one of the plurality of fingers is bent in a downward direction toward the floor, and at least one of the plurality of fingers is positioned to a side of the base. Further, the base preferably includes at least one stop bar that extends from the side to a position underneath the at least one of the side-positioned fingers. Still further, at least one of the plurality of fingers may extend through an aperture in the base. Even further, one or more of the plurality of fingers may be mounted to the frame with a hinge, along a hinge axis, to facilitate removable holding of the marker.

Those skilled in the art will more readily appreciate and understand the features of the present invention when considered in the context of the accompanying drawings, which are briefly described in the next second and then described in more detail in the section thereafter.

BRIEF DESCRIPTION OF THE DRAWINGS

FIG. 1 is a cross-sectional view that shows a wood-look polyurethane floor according to one preferred embodiment of the invention.

FIG. 1A shows an enlarged section of the wood-look polyurethane floor shown in FIG. 1.

DETAILED DESCRIPTION OF THE DRAWINGS

Figure 2:
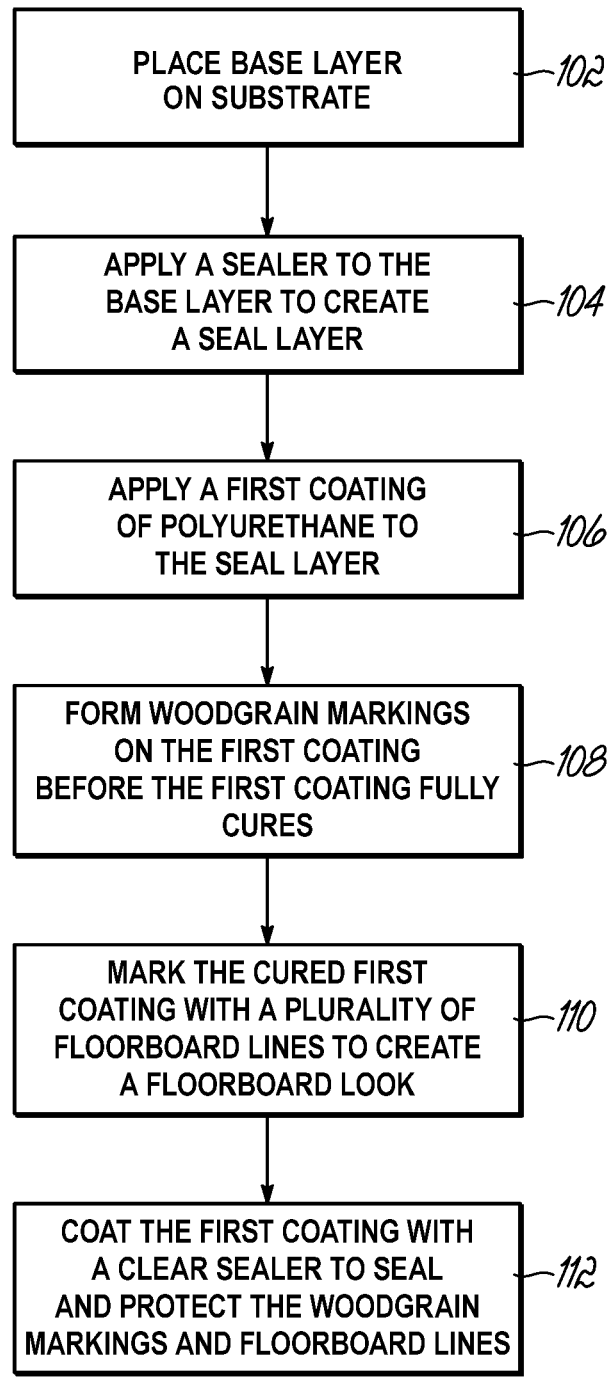
FIG. 2 is a schematic flowchart that shows a sequence of steps performed by an installer to make the wood-look polyurethane floor of the present invention.

FIG. 1 shows a preferred embodiment of the present invention, a polyurethane floor 10 with a woodgrain or "wood look," and can be best understood when considered in the context of a conventionally installed poured polyurethane floor. As best shown in FIG. 1A, the polyurethane floor 10 comprises a base layer 12 of uniform thickness that is adhered to an underlying substrate 14 with an adhesive 16. The base layer 12 typically comes in rolled sheets, and the installer applies a uniform layer of sealer 18 to the top of the base layer 12. The sealer 18 is typically a polyurethane. A fabric mesh layer 20 may reside on top of the sealer 18 for lateral stability, if desired. Thereafter, a coating of polyurethane 22, alternatively referred to as the wear or structural layer, is applied to the top of the sealer 18. Typically the polyurethane structural layer 22 is poured on and is evenly distributed, as known in the art, to produce a layer having a uniform thickness of about two millimeters. Thereafter, the installer may add an additional layer of the same material, with the same thickness, thereby to build the total thickness up to a desired thickness, such as four millimeters, four example. Finally, the installer applies a final clear seal top coat layer 24, or finish layer, to protect the polyurethane structural layer(s) 22.

As shown in FIG. 1, depending on the location of the floor 10, the installer may install a rubber base 26, such as perimeter molding, to cover a joint between the floor 10 and a surrounding wall 28. Typically, the rubber base 26 is anchored to the floor 10 and wall 28 using a standard base cement, and it protects the floor 10 surface from erosion and wear from normal use. Furthermore, if the end of the floor 10 does not abut the wall 28, a reducer 30 may be installed to create a smooth transition from the floor 10 to the substrate 14. The reducer 30 also minimizes wear and damage to the exposed end of the floor 10. Although the features of the invention are illustrated or described in connection with a basketball court, it is understood that the present invention may be used with any type of synthetic floor that requires a woodgrain or wood look, such as a gymnasium floor, a track, or a bowling lane, for example.

FIG. 2 is a flow chart that shows the steps performed to make the polyurethane floor 10 with a woodgrain or wood look. In this regard, the substrate 14 is commonly a pre-existing floor having a hard surface, such as a concrete floor or pad, for example. The substrate 14 may need to be prepped prior to installation of the polyurethane floor 10. In some instances, the surface of the substrate 14 to be coated may need to be prepared by cleaning and/or stripping to remove previous coatings, priming, or other debris. For a newly formed substrate 14, such as newly poured concrete, the surface may need to be inspected for proper levelness tolerance, dryness, and possible contamination. In any event, the substrate 14 must be in a clean and acceptable condition prior to forming the polyurethane floor 10 thereon.

As shown in FIG. 2, according to a first step 102, the installer applies the base layer 12 to the lower substrate 14. The base layer 12 may be polyurethane or, in the preferred embodiment, a base mat such as a rubber granulated shock pad, for example. Where the base layer 12 is a base mat, step 102 further requires the installer to apply adhesive 16 to the substrate 14, such as a two-component Tacly Adhesive, before application of the base mat to the substrate 14. The installer may use a notched trowel to apply the adhesive 16 to the substrate 14. Thereafter, the installer applies the base mat to the adhesive 16 covered substrate 14. Often the base mat is rolled for storage and requires unrolling for installation to the substrate 14. To ensure a seamless compression fit of the base mat to the substrate 14, a flooring roller may be necessary to roll flat the base mat for adherence to the substrate 14. The base layer 12 supplies underlying resilience for the floor 10, and can vary in thickness and hardness as desired.

Once the base layer 12 has been applied to the substrate 14, the next step 104 involves applying the sealer 18 to the base layer 12 to create the seal layer. In this step, the installer applies the sealer 18, such as a two-component EG2000 Sealer, to the top of the base layer 12 and allows the sealer 18 to cure, which generally takes a minimum of 12 hours. The sealer 18 may be spread over the top of the base layer 12 using a trowel. Once the sealer 18 is applied, but not yet fully cured, a layer of fabric mesh 20 may be placed on the sealer 18, if desired. The fabric mesh 20 provides lateral stability for the floor 10 and may be formed of a nylon or polyester weave, or other like material. After the sealer 18 has fully cured, the installer then applies the first coating of the polyurethane structural layer 22 to the sealer 18, in step 106. The first coating of the polyurethane structural layer 22 typically comprises a pigmented polyurethane resin. This step 106 may include two or more separate applications of polyurethane to form the structural layer 22 depending upon the desired characteristics for the floor 10. Each application of polyurethane may be a different color, for example. To this end, each application of polyurethane resin requires sufficient cure time, which may take anywhere from 12 to 48 hours.

Figure 3A:
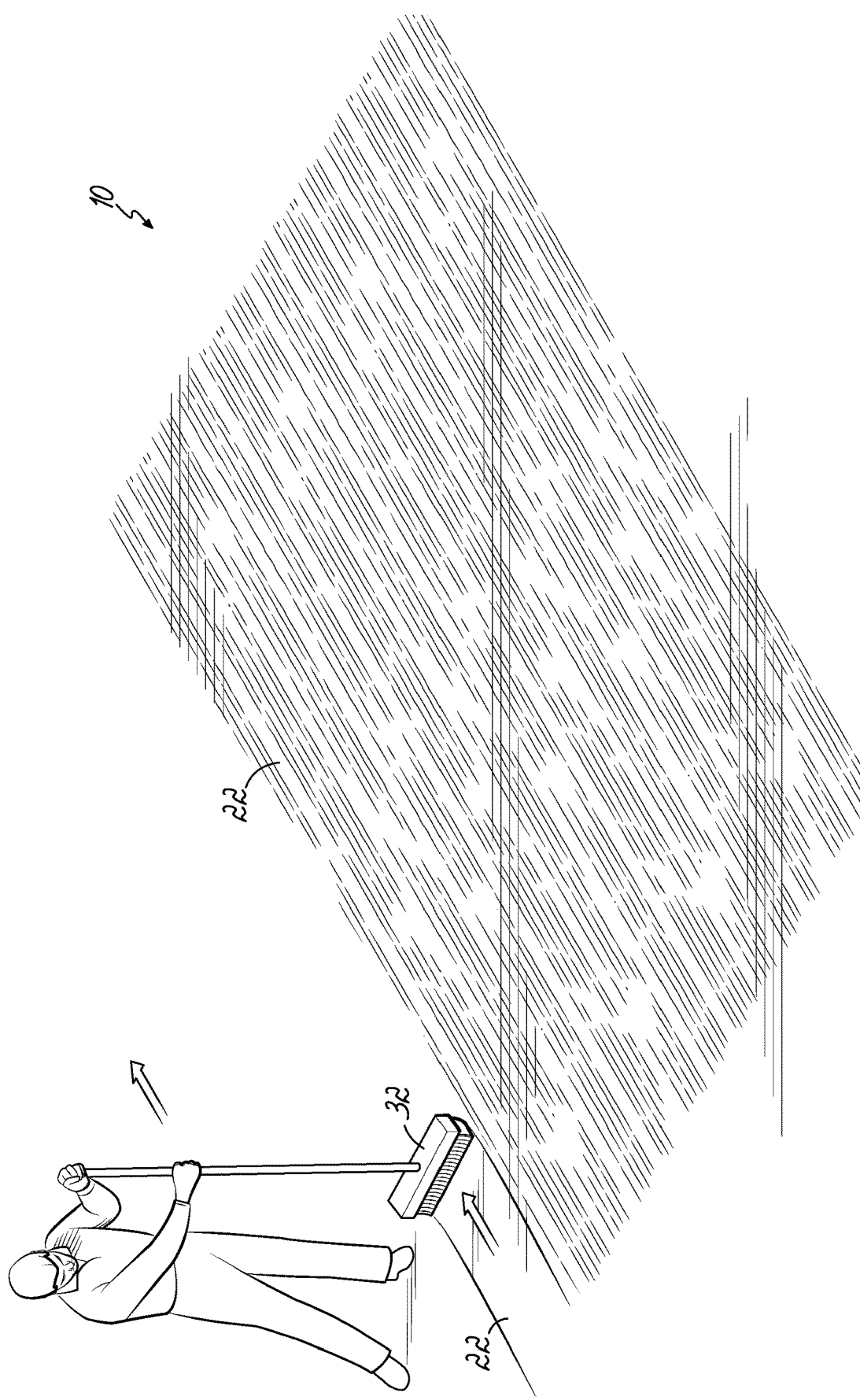
FIG. 3A is a perspective view that shows an installer using a brush to create woodgrain markings, according to a preferred embodiment of the invention.

According to the next step 108, the installer then adds the woodgrain markings to the floor 10 prior to completion of the curing of the top-most polyurethane structural layer 22. As shown in FIG. 3A, the installer preferably forms the woodgrain markings by moving a blacktop or concrete brush 32 or broom over the topmost semi-cured polyurethane structural layer 22, generally in parallel rows across the entire floor 10. If desired, some degree of waviness may be added by the installer as he/she moves the brush 32 over the surface, so as to create a more natural woodgrain appearance. According to the preferred embodiment, steps 106 and 108 are typically completed contemporaneously. For example, where the floor 10 being formed is a basketball court, after the completion of steps 102 and 104, one or more installer(s) next mark off the perimeter and centerlines of the basketball court using chalk. The installers may also use masking tape or plastic sheeting to tape off the baselines for a clean "pull-off" area at both ends of the court after the completion of steps 106 and 108. With respect to steps 106 and 108, the installers may pour one half of the basketball court at a time. For each half of the court, the installers may apply the polyurethane structural layer 22, including forming the woodgrain markings therein, in small sections, such as a four foot wide strip running the length of a half of the court. In this regard, one installer rolls out a four foot wide section of the polyurethane structural layer 22 to a uniform application. Once completely rolled out and uniform, another installer then applies the brushed striations into the partially cured polyurethane structural layer 22 to create the woodgrain markings. The step 108 of creating the woodgrain markings is preferably performed about 5-10 minutes after initial curing of the polyurethane structural layer 22 has begun. Typically, application of the brushed striations is completed by making two passes over the polyurethane structural layer 22 with the brush 32. Each pass is a single, non-stop procedure performed by placing the brush 32 on the centerline, then stroking (i.e., pulling or pushing) the brush 32 over the polyurethane structural layer 22 the length of the half-court, in a direction that would represent the longitudinal orientation of floorboards. However, fewer or more passes may be performed as necessary to achieve the desired woodgrain markings. This process is then repeated for each four-foot section for the first half of the court, and then again for the second half of the court. To this end, the brush 32 causes woodgrain markings in the semi-cured polyurethane structural layer 22 due to the darker, base layer 12 residing therebelow. Once steps 106 and 108 are complete, the polyurethane structural layer 22 is then permitted to fully cure. Although this specification describes steps 106 and 108 being performed sequentially on smaller sections of the floor 10, these steps 106 and 108 could be performed on the entire floor 10 at once, if desired.

Figure 3B:
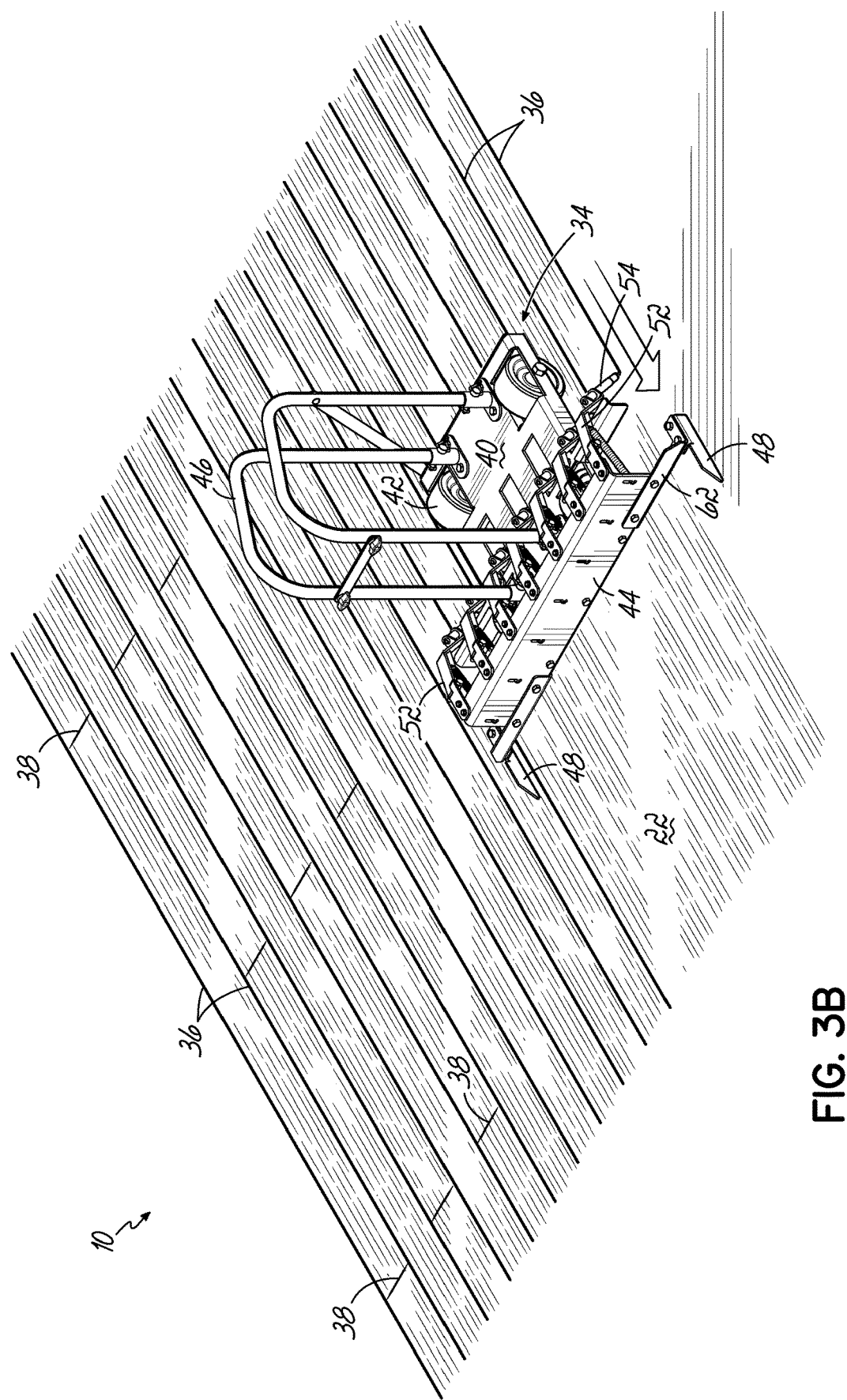
FIG. 3B is a perspective view that shows a floorboard marking apparatus used to create floorboard lines, according to a preferred embodiment of the invention.

Once steps 106 and 108 are complete for the entire floor 10, and the polyurethane structural layer 22 has cured, a plurality of floorboard lines 36 or other markings such as boardmarkings, game lines, and logos, for example, may then be applied to the floor 10, at step 110. Generally, for floors requiring game lines and logos, such as a basketball court, the installer applies the game lines and logos to the floor 10 after the polyurethane structural layer(s) 22 have fully cured. In any event, once the polyurethane structural layer(s) 22 has cured, at step 110, the installer then adds parallel longitudinal floorboard line markings 36 to the cured polyurethane structural layer 22 to mimic the look of hardwood floorboards, as best shown in FIG. 3B. The longitudinal floorboard lines 36 are typically oriented in a generally parallel direction with the woodgrain markings. As shown, preferably, the installer uses a floorboard marking apparatus 34, or tool, to create the longitudinal floorboard lines 36, which will be described in additional detail below. Thereafter, the installer adds appropriately spaced transverse floorboard lines 38 to mimic a row of floorboards laid end to end. The transverse floorboard lines 38 may be applied by hand using a guide or other suitable tool. Alternatively, the transverse floorboard lines 38 may be applied using the floorboard marking apparatus 34.

After the floorboard lines 36, boardmarkings, game lines, logos, and other related markings are applied to the floor 10 in step 110, the installer next applies the top coat or clear sealer 24 to seal and protect the woodgrain markings and the floorboard lines 36, at step 112. Sufficient cure time must pass before proceeding from step 110 to step 112, which is typically at least 24 to 48 hours. Step 112 is typically completed in the same day by a multi-person crew of installers. In this regard, the installers may apply the clear sealer 24 to the floor 10 in small sections, such as an eight or ten foot wide strip running across the short dimension of the floor 10 (e.g., from sideline to sideline for a basketball court). For each section, the installer rolls out the clear sealer 24 to a uniform thickness using a roller, as is known in the industry. This process is then repeated for each section until the clear sealer 24 is applied to the floor 10, as desired, and the clear sealer 24 is permitted to cure. Again, although this application refers to sequential coating of smaller sections of the floor 10, step 112 could be performed so as to coat the entire floor 10 at once with the clear sealer 24. Once the clear sealer 24 has fully cured, which typically takes anywhere from 24 hours to one week, depending on environmental conditions, the floor 10 is ready for use.

Figure 4:
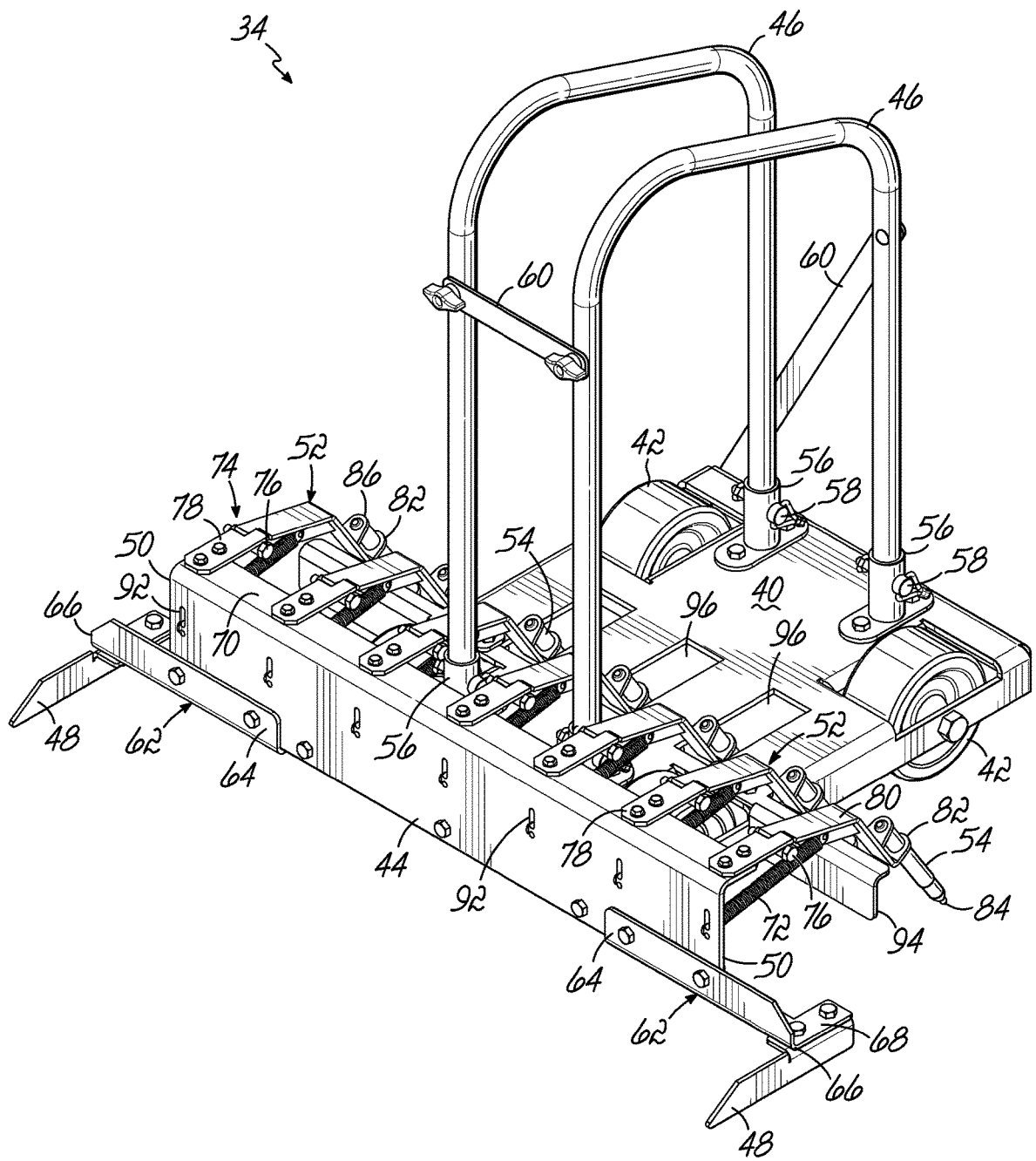
FIG. 4 is an enlarged perspective view of the floorboard marking apparatus shown in FIG. 3B.
Figure 5:
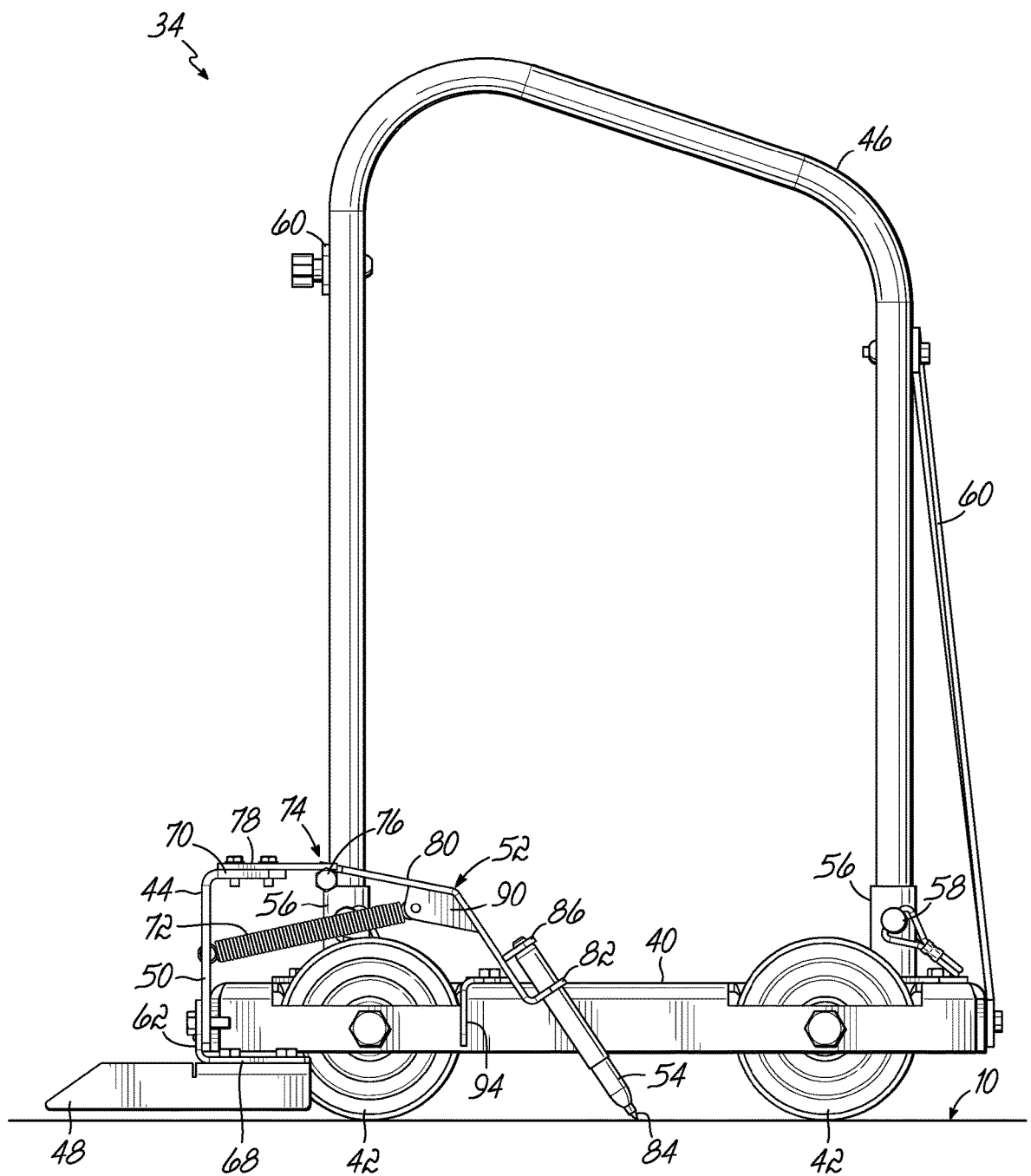
FIG. 5 is a side view of the floorboard marking apparatus shown in FIGS. 3B and 4.
Figure 6:
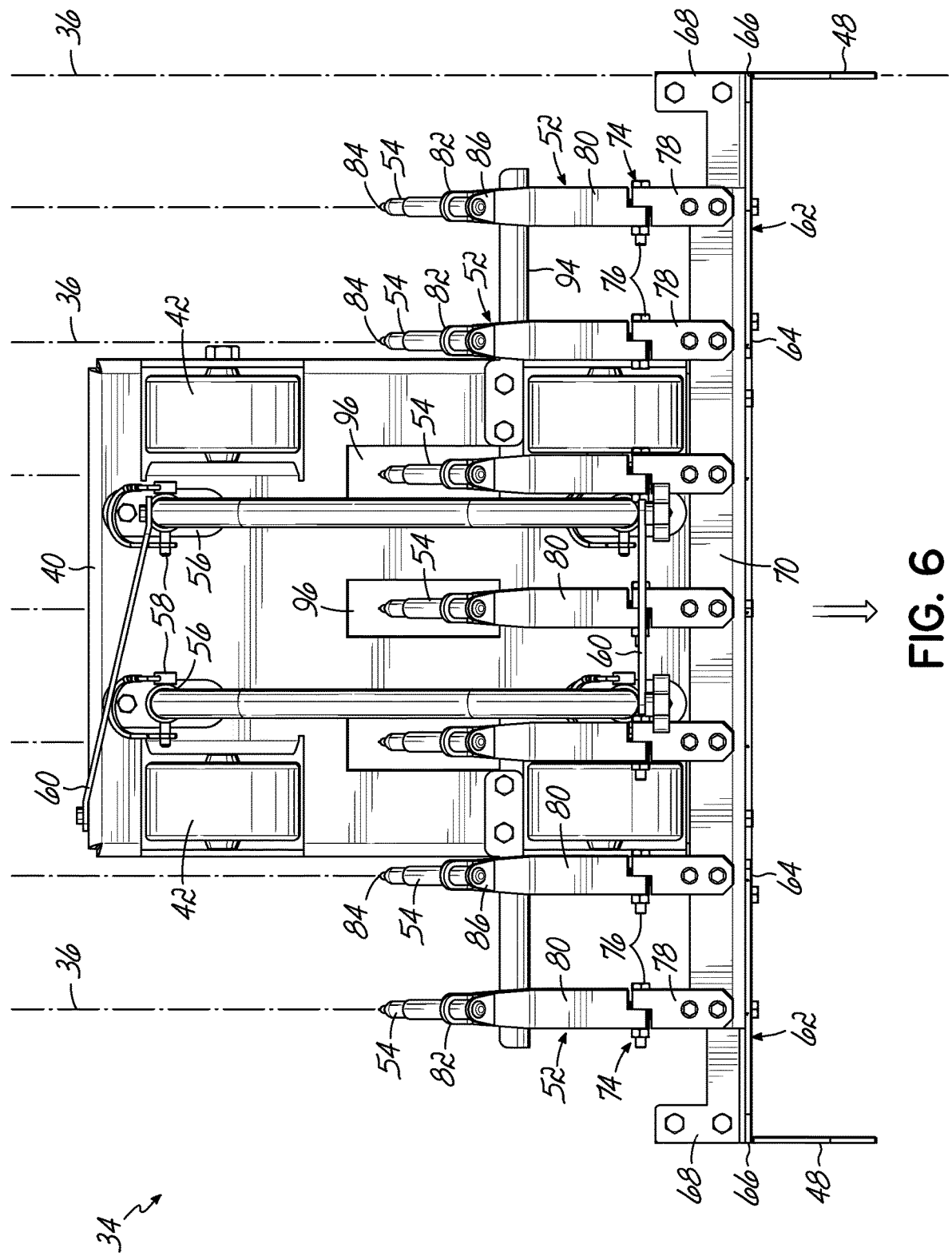
FIG. 6 is a top view of the floorboard marking apparatus shown in FIGS. 3B, 4, and 5.

FIGS. 4-6 show a preferred embodiment of the floorboard marking apparatus 34. As described above and shown in FIG. 3B, the floorboard marking apparatus 34 is used at step 110 to apply parallel longitudinal floorboard lines 36 to the cured polyurethane structural layer 22 of the floor 10. These floorboard lines 36 mimic the look of a hardwood floor (i.e., multiple parallel rows of floorboards laid end to end). As shown in FIG. 4, the floorboard marking apparatus 34 includes a base 40 supported by a plurality of wheels 42, a transversely oriented, elongated frame 44 mounted to the front of the base 40, and a pair of spaced apart handles 46 extending upwardly from the base 40. The frame 44 includes a pair of elongated guides 48 located at opposite, outermost ends 50 of the frame 44, and a plurality of fingers 52 hingedly mounted to the frame 44 and extending in a rearward direction toward the base 40. Each finger 52 is configured to support a marker 54, such as a Sharpie®-type permanent marker, such that a marking end or tip 84 of the marker 54 is biased in a downward direction toward the floor 10 so as to engage the floor 10 for marking floorboard lines 36 thereon, as described in further detail below. As shown in FIGS. 4, 5, and 6, the apparatus 34 uses four wide-rimmed wheels 42 that are preferably machine-ground to a flat condition. This assures optimum surface to surface contact between the wheels 42 and the floor 10 surface during movement, to thereby facilitate controlled rolling movement of the base 40 over the floor 10 during floorboard marking.

The handles 46 are used by the installer to maneuver the floorboard marking apparatus 34 and to apply appropriate downward force on the apparatus 34 during movement, particularly while marking the floorboard lines 36 on the floor 10. With reference to FIGS. 4 and 5, the handles 46 are spaced apart across a width of the base 40, and each handle 46 extends from the rear of the base 40 to the front of the base 40. The installer grasps the handles 46 to push the floorboard marking apparatus 34 across the floor 10. Each handle 46 is generally U-shaped and configured to be removably attached to the base 40. The base 40 includes a pair of attachment points 56 for receiving and supporting each handle 46 in an upright position. As shown, for each pair of attachment points 56, one attachment point 56 is located proximate to the rear of the base 40 and the other attachment point 56 is located proximate to the front of the base 40. Once engaged with the attachment points 56, each end of the handle 46 is configured to be locked in place thereto via a locking mechanism 58, such as a clevis pin, wire lock pin, cotterless hitch pin, or other similar locking device. The handles 46 may further include one or more braces 60 extending therebetween, or between each handle 46 and the base 40 to provide additional support. The brace(s) 60 are removably attached to the handles 46 using a nut and bolt combination, a bolt having a screw handle, or other suitable structure. In any event, the handles 46 are preferably removably attached to the base 40 so that they can be removed for convenience when storing or transporting the floorboard marking apparatus 34.

With continued reference to FIGS. 4 and 5, the frame 44 is mounted to the front of the base 40 in a transverse orientation to support a plurality of fingers 52. The frame 44 may be removably mounted to the base 40 using bolts, for example, or be permanently fixed to the base 40 by welding, for example. In any event, the frame 44 extends along the front of the base 40 and has an elongated length greater than the width of the base 40, such that a portion of the frame 44 extends beyond each side of the base 40. The frame 44 includes a pair of opposing elongated guides 48 which are positioned beyond the opposite, outermost ends 50 of the frame 44. Each guide 48 is held to the frame 44 by a corresponding support arm 62 that extends therefrom. More specifically, a proximal end 64 of each support arm 62 is mounted to the frame 44 such that the support arm 62 extends outwardly from the outermost end 50 thereof, to a distal end 66 to which the corresponding guide 48 is mounted. Thereby, each support arm 62 spaces a respective guide 48 a distance away from the corresponding outermost end 50 of the frame 44. Each support arm 62 may be removably mounted to the frame 44 using a bolt having a screw handle, for example, or alternatively, may be fixed to the base 40 by welding, for example. In either case, the distal end 66 of each support arm 62 includes a tab 68 or extension to which the guide 48 is mounted, where the tab 68 extends perpendicular to the support arm 62 to facilitate mounting of the guide 48 in a desired position. The guides 48 extend beyond the front of the frame 44 to enable the installer to visually align the movement of the floorboard marking apparatus 34 in the desired direction, to create parallel floorboard lines 36 on the floor 10 surface, as shown in FIG. 6. To accommodate for different floorboard widths, for example, the support arms 62 may be adjustable laterally, to thereby alter the spacing of the guides 48 from the corresponding outermost ends 50 of the frame 44.

The frame 44 includes a plurality of fingers 52, with each finger 52 adapted to removably hold a corresponding marker 54 in a spring-loaded, downwardly-biased condition so as to engage the floor 10 and to mark a line thereon as the operator moves the floorboard marking apparatus 34 across the floor 10. In this regard, each finger 52 is hingedly mounted to a rearwardly extending flange 70 formed on the top of the frame 44, and biased downwardly by a spring 72. Each finger 52 mounts to the flange 70 with a hinge 74 having a hinge pin 76 that defines a horizontal hinge axis for the finger 52, and each hinge 74 extends from the flange 70 rearwardly to position the respective finger 52 behind the frame 44. The hinges 74 are spaced apart predetermined distances along the length of the frame 44, at distances which generally correspond to the widths of a standard floorboard. In an alternative embodiment, the spacing of the hinges 74 and fingers 52 may be adjustable to accommodate different floorboard widths.

As best shown in FIG. 5, each hinge 74 includes a first hinge leaf 78 mounted to the flange 70 and a second hinge leaf 80 connected to the first hinge leaf 78, wherein the second hinge leaf 80 is part of, or transitions to the finger 52 as a unitary piece. To couple each finger 52 to the flange 70, the first and second corresponding hinge leaves 78, 80 are coupled together with the hinge pin 76, nut and bolt combo, or other similar means, which defines the hinge axis for each finger 52. In this configuration, each finger 52 extends from a corresponding hinge 74 in a rearward direction and terminates at an end of the mount 82 for rearwardly mounting of a corresponding marker 54 thereto. In this regard, to best position the writing end 84 of the marker 54 on the floor 10, a portion of each finger 52 is angled in a direction from horizontal downwardly toward the floor 10. That is, when the first and second hinge leaves 78, 80 are horizontally aligned (i.e., coplanar), the corresponding finger 52 is bent or curved such that the end of the finger 52 and the corresponding mount 82 are angled downwardly from the horizontal plane defined by the hinge leaves 78, 80, so as to position the marker 54 in contact with the floor 10. The portion of the finger 52 may be angled downwardly between 15 degrees to 45 degrees from horizontal, and more preferably, angled 30 degrees, downwardly from horizontal. As shown, each mount 82 also includes a retainer 86 such as one or more elastic bands, clamps, straps, or other similar structure for removably mounting the marker 54 to the finger 52. This type of retainer 86 further allows for adjustability of the marker 54 within the mount. As shown, a barrel of each marker 54 is received in each corresponding mount 82 such that the marker 54 extends in a direction parallel to the angled portion of the finger 52 and toward the floor 10 for marking the floorboard lines 36 thereon.

With continued reference to FIG. 5, the spring 72 of each finger 52 is configured to ensure engagement of the writing end or tip 84 of the marker 54 with the floor 10. In this regard, the spring 72 generates a downward bias on the finger 52 to assure continued contact of the marker 54 with the floor 10 during movement of the floorboard marking apparatus 34 therealong. As shown, for each finger 52, a rearward end of the spring 72 is attached to a bracket 90 on the underside of the finger 52. The forward end of the spring 72 is attached to the frame 44, which may have an aperture 92 or other attachment point 56 for attachment thereof, as shown in FIG. 4. As a result of the hinged attachment of the finger 52 to the frame 44, the spring 72 biases the finger 52 in a downward direction about the hinge axis and toward the floor 10. More particularly, the spring 72 biases the marker 54 toward the floor 10. To limit downward movement of the fingers 52 that are located beyond the sides of the base 40, the base 40 may include one or more stop bars 94, as best shown in FIG. 6. Each stop bar 94 mounts to a corresponding side of the base 40 and extends therefrom in a direction parallel to the frame 44. The stop bars 94 are positioned underneath the fingers 52 and are configured to be in a confronting relationship with the corresponding fingers 52. In this regard, the fingers 52 are configured to abut the stop bar 94 at a certain rotational position about the hinge axis to thereby limit the downward biasing movement of the finger 52 by the spring 72. As seen in FIGS. 4 and 6, some fingers 52 are positioned over the base 40 of the floorboard marking apparatus 34 and extend through corresponding apertures 96 in the base 40 to engage the floor 10. In an alternative embodiment, the center of the base 40 may include a single opening for all the fingers 52 positioned over the base 40. In any case, for these fingers 52, a portion of the base 40 may serve a similar function as the stop bars 94 to limit downward movement of the fingers 52 by each spring 72.

Those skilled in the art will appreciate that this specification identifies and describes presently preferred embodiments of this invention. Such persons skilled in the art will also recognize that this specification focuses on currently known examples related to the present invention, but that these currently known examples should not be treated as limitations. Accordingly, the following claims set forth the subject matter which applicant regards as patentable over the known prior art, not the specific examples described above, nor any other specific details of this disclosure not included in the relevant claims.

The invention claimed is:

1. A seamless synthetic floor, comprising:
a substrate;
a resilient base layer of uniform thickness adhered to the substrate with an adhesive;
a continuous seal layer formed on top of the base layer across the entire seamless synthetic floor;
a continuous coating of polyurethane formed on top of the seal layer, the coating of polyurethane having continuous wood-grain markings formed therein, substantially all of the wood-grain markings arranged in a same direction in parallel rows across the entire seamless synthetic floor to create a wood-grain look and a plurality of floorboard lines marked thereon across the entire seamless synthetic floor to create a floorboard look, wherein the wood-grain look and floorboard look together form a wood look mimicking a look of a hardwood floor; and
a clear, continuous sealer topcoat formed on top of the coating of polyurethane across the entire seamless synthetic floor, thereby to seal and protect the wood-grain markings formed in the coating and the floorboard lines marked thereon.

2. The seamless synthetic floor of claim 1, wherein the coating of polyurethane is formed on top of an underlying coating of polyurethane that is formed on the seal layer.

3. The seamless synthetic floor of claim 2, wherein the underlying coating of polyurethane and the coating of polyurethane are two different colors.

4. The seamless synthetic floor of claim 1, wherein a fabric mesh layer resides above the seal layer to provide lateral stability for the seamless synthetic floor.

5. The seamless synthetic floor of claim 4, wherein the fabric mesh layer is formed of polyester.

6. The seamless synthetic floor of claim 1, wherein a rubber base is fixed to the clear sealer topcoat to cover a joint between the synthetic floor and a surrounding wall.

7. The seamless synthetic floor of claim 1, wherein the resilient base layer is a base mat.

8. The seamless synthetic floor of claim 7, wherein the base mat is a rubber granulated base mat.

\* \* \* \* \*